United States Patent [19]

Rumpeltin et al.

[11] Patent Number: 5,302,563
[45] Date of Patent: Apr. 12, 1994

[54] SPRAYABLE REFRACTORY COMPOSITION

[75] Inventors: Charles R. Rumpeltin, 10 Pheasant Ct., Flanders, N.J. 07836; Julie A. Dody, 3569 New Hampshire Ave., Easton, Pa. 18042

[73] Assignee: Minerals Technologies, Inc., New York, N.Y.

[21] Appl. No.: 847,560

[22] Filed: Mar. 6, 1992

[51] Int. Cl.[5] ............... C04B 35/02; C04B 35/04
[52] U.S. Cl. ............................. 501/111; 501/95; 501/100; 501/101; 501/109; 501/125; 501/127; 106/690; 106/691; 427/421; 427/427; 266/280; 266/286
[58] Field of Search ............ 106/690, 691; 501/81, 501/83, 94, 95, 98, 109, 123, 124, 125, 141, 142, 127; 264/44; 266/280, 286

[56] References Cited

U.S. PATENT DOCUMENTS

| | | | |
|---|---|---|---|
| 3,468,750 | 9/1969 | Pfeifer et al. | 106/691 |
| 4,222,782 | 9/1980 | Alliegro et al. | 106/57 |
| 4,393,143 | 7/1983 | Yoshinaka et al. | 501/89 |
| 4,427,800 | 1/1984 | Nakamura et al. | 523/145 |
| 4,431,745 | 2/1984 | Watanabe et al. | 501/101 |
| 4,508,835 | 4/1985 | Kaniuk et al. | 501/94 |
| 4,703,022 | 10/1987 | Johnson | 501/95 |
| 4,869,468 | 9/1989 | Johnson | 266/44 |
| 5,036,029 | 7/1991 | Johnson | 501/121 |
| 5,061,526 | 10/1991 | Robyn et al. | 427/422 |
| 5,073,525 | 12/1991 | Cheng et al. | 501/81 |

OTHER PUBLICATIONS

Baker et al., Ceramic Bulletin, vol. 57(7), 667–671 (1978).
Damiano, Steel World, 50–53 (1991).
Keran et al., Iron and Steel Engineer, (1987).
The Making, Shaping and Treating of Steel, Harold E. McGannon (ed.), U.S. Steel, Ninth Edition, pp. 51–61 (1971).
The Making, Shaping and Treating of Steel, W. T. Lankford, Jr. et al., U.S. Steel, Tenth Edition, pp. 43, 59–60, (1985).
Mack et al., "Latest Refractory Practices in Electric Arc Melting", pp. 1–19 (1969).
Norton, Refractories, Third Edition, (1949), pp. 465–466, 475, 476.

(List continued on next page.)

Primary Examiner—Mark L. Bell
Assistant Examiner—Michael Marcheschi
Attorney, Agent, or Firm—Pennie & Edmonds

[57] ABSTRACT

The present invention discloses an alkali oxide free low density refractory material especially adapted for use as a disposable liner material for molten metal containing vessels. This material includes about 0.1 to about 2 weight percent of a stiffening agent, about 0.1 to about 2 weight percent of a set retarding agent, about 0.1 to 6 weight percent of density reducing materials, about 0.1 to about 5 weight percent of a plasticizer, up to about 2 weight percent of a secondary binder, and the balance of a refractory aggregate which is preferably MgO. The stiffening agent and set retarding agent are used in substantially the same amounts to provide the disclosed refractory material with increased resistance to slumping while, at the same time, allowing spraying apparatus residence times of up to 30-40 minutes without clogging. The composition includes less than about 0.1 weight percent of alkali oxides, so that reaction and fusion of the disposable liner with a permanent liner is avoided thereby allowing increased ease in mechanical removal of the disposable liner. Also, the invention relates to methods for applying the disposable lining by spraying and an apparatus for holding molten metal which includes a steel shell, a relatively permanent refractory lining disposed therein and a disposable lining disposed upon at least a portion of the permanent refractory lining.

25 Claims, No Drawings

OTHER PUBLICATIONS

Rigby et al., "Action of Alkali And Alkali-Vanadium Oxide Slags On Alumina-Silica Refractories" *Journal of The American Ceramic Society*—vol. 45 (2), pp. 68-73 (1962).
Searle, *Refractory Materials: Their Manufacture And Uses*, 1924; pp. 599, 607, 617-618; 297, 184.
*Refractories Manual*, American Foundrymen's Society, 1963, pp. 10-11.
"Tomorrow's Mink-Lined Blast Furnace," 33, *The Magazine of Metals Producing*, Jul. 1968, pp. 81-84; 88.
"Tundish Spray Gunning Mix" *Technical Data*, (1991).
Nonaka et al., "Robotic Gunning System for Coating A Tundish", *Iron and Steel Engineer*, pp. 19-23, (1987).
Watroba, T. S., "A Study Comparing Insulative Tundish Lining Systems at Rouge Steel Company," *Iron & Steelmaker*, Nov. 1988, pp. 49-51.
"Refractories For the Continuous Caster Tundish", *Nalco Technology*, 1981.
"Using High-Density, High Alumina Refractories", *Foundry*, Jul. 1970, pp. 113-114.
Kaolin Clays and Their Industrial Uses, J. M. Huber Corp., Chapter 17, part 4, "Ceramics", pp. 143-144 (1955).
Physical & Chemical Properties 6172-C Insulating Tundish Veneer, (Mar. 1988).
Physical & Chemical Properties 6819 Insulating Tundish Veneer (Apr. 1988).
"Analysis of Spalled Harbison-Walker Brick Samples", Quigley Co., Inc. Nov. 1986.
*Refractories*, General Refractories Company, 1949, p. 259.

SPRAYABLE REFRACTORY COMPOSITION

TECHNICAL FIELD

The present invention relates to substantially alkali-free refractory compositions which are preferably mixed with water and sprayed onto a permanent lining of a tundish to form a disposable lining thereon.

BACKGROUND OF THE INVENTION

Tundishes and ladles are intermediate containment vessels utilized in processing metals and metal alloys. These vessels contain a permanent refractory lining material which has high temperature resistance. A material such as 50 to 70% $Al_2O_3$ brick is often used to form the permanent refractory lining. Although permanent liner materials are highly temperature resistant, contact with molten metal and numerous cycles of heating and cooling during molten metal processing can degrade and necessitate frequent replacement of the permanent liner. Therefore, disposable liners formed of dry vibratable, trowellable, gunnable or sprayable refractory materials are formed upon the permanent liner of a tundish or other molten metal processing vessel permanent liner.

The disposable liner acts as a thermal and chemical barrier which protects the permanent liner and simultaneously maintains the temperature of the molten metal. After a tundish or ladle has been utilized for numerous cycles, the disposable liner is replaced. Since the disposable liner has a different coefficient of thermal expansion as compared to the permanent liner, "deskulling" or removal of the disposable liner should be easily accomplished. However, refractory compositions of the past utilized to form such disposable liners have often included alkali oxides such as, for example, $Na_2O$ and $K_2O$. Heat penetration of the tundish or ladle can cause a reaction which occurs at the interface of the disposable and permanent linings. At this interface, the alkali metal oxides may react with the permanent liner thereby causing fusion of the two liners. Therefore, deskulling of the disposable liner becomes difficult, and portions of the permanent liner which fuse to the disposable liner can be removed during this operation. Furthermore, contamination of the permanent liner increases the coefficient of thermal expansion of the layer adjacent the disposable liner. The differences in expansion between this layer and the remainder of the permanent liner can result in sheet spalling of the permanent liner, thus leading to premature failure.

Basic refractor materials are commonly used as disposable lining materials. The term "basic" refers to the chemical behavior of these materials rather than the complexity of their composition. Basic refractory materials include magnesia, doloma, olivine, calcia or mixtures thereof.

In addition to the refractory aggregate; such conventional refractory compositions may also include various binders, density reducing materials and plasticizers. Furthermore, water is generally added to the composition in order to facilitate application by trowelling, gunning or spraying.

Sprayable refractory materials generally contain from about 20 to 30 weight percent water, thus enabling them to be pumped through a hose and to be sprayed when mixed with compressed air in a spray gun. Sprayable liners are well adapted for use in casting vessels such as hot tops, ladles, tundishes, troughs and pipes.

It has heretofore been observed that sprayable refractory materials can suffer from slumping, i.e., a condition in which a recently applied refractory material lacks the necessary adhesion to remain fixed to the surface to which it is applied.

Therefore, it would be highly advantageous to provide a sprayable refractory material for use as a disposable lining which provides satisfactory thermal insulation, ease of removal from the permanent liner and which provides a uniform layer without significant slumping of wet material. It would be further advantageous to provide a sprayable material which achieves the above advantages while also providing a density of less than about 100 pounds per cubic foot ("p.c.f.") while allowing a spray gun residence time of up to about 30–40 minutes without blockages. Moreover, if these materials could be essentially free of alkali oxides, the problem of contamination and/or premature deterioration of the permanent lining could be reduced.

SUMMARY OF THE INVENTION

In accordance with the present invention, a substantially alkali oxide free refractory material is provided which can be applied as a disposable refractory lining which has satisfactory chemical and high temperature resistance and provides ease of removal after cooling.

In particular, the present invention provides a low density, substantially alkali oxide free refractory composition which contains less than about 0.1 weight percent alkali oxides. Furthermore, the composition resists clumping when applied by spraying while simultaneously providing a residence time of up to about 30 to 40 minutes without blocking the spray apparatus. The dried density of the composition is below 100 p.c.f. and typically between about 80 to 95 p.c.f. Also, the alkali containing components of the composition total no more than about 0.1% by weight of the overall composition. Therefore, disposable linings formed from the refractory compositions of the present invention help to enhance the longevity of the permanent linings within the casting vessel.

The preceding advantages are obtained in a refractory composition that includes a stiffening agent, a set retarding agent, one or more density reducing materials, a plasticizer, a secondary binder and a refractory aggregate. Also, the stiffening agent and set retarder can be added in predetermined weight ratios to achieve optimal performance during spray application of the composition.

DETAILED DESCRIPTION OF THE INVENTION

In the description which follows, all references to percentage or % refer to percent by weight unless otherwise noted.

The present invention is directed to refractory compositions which include, as a principle component, any one of various refractory aggregates such as magnesia, doloma, olivine, calcia, alumina, silica and combinations thereof. For disposable casting vessel or tundish linings, the preferred refractory aggregate would be a basic refractory, and most preferably, one based on magnesia or other sources of MgO.

The magnesia aggregate should contain at least about 50 to 95% MgO. Thus, any source of MgO providing a water insoluble particulate refractory grain may be selected, such as dead burned magnesia, periclase or the like. In formulating an alkali oxide free composition, the remaining percentage of the refractory aggregate should not contain any significant amount of alkali oxide components.

The refractory aggregate constitutes about 83% or more of the overall composition, and preferably above about 90%. When magnesia is used as the aggregate, a portion may be substituted with olivine, if desired. Thus, the MgO content of the overall composition supplied by the refractory aggregate can vary from about 38% to 99%, while olivine can be used in an amount of up to 45%.

A plasticizer is added to enhance the ability of the composition to adhere to itself and the surfaces to which it is applied. The plasticizer is utilized in an amount of about 0.1 to about 5%. It is preferred that the plasticizer be a clay selected from bentonite, kaolin clay and ball clay. However, it is especially preferred to select bentonite clay as the plasticizer.

To control the density of the composition, at least one density reducing material is added in an amount of between about 0.1 and about 6%. Any of a wide variety of density reducing materials may be utilized, including inorganic or organic fibers, expanded inorganic or organic materials, or other lightweight fillers. Paper fibers (either coarse or fine), ceramic or glass fibers, rockwool, expanded clay, and polystyrene beads are typical components that can be added.

Advantageously, the density reducing material is a combination of a cellulose fiber and expanded polystyrene beads. It is preferred that the organic fiber be coarse paper fibers, fine paper fibers or mixtures thereof. These fibers generally would have fiber lengths of from about 0.1 to about 1.5 mm. The use of these fibers enables the refractory composition of the present invention to provide a dried density of less than about 100 pounds per cubic foot.

Along with the paper fibers, fine perlite, expanded polystyrene beads, expanded fire clay and mixtures thereof are added to further reduce the density of the composition. It is most preferred to select expanded polystyrene beads having an average particle diameter of from about 0.5 to about 2 mm, a bulk density of about 1 to 2 lb/ft$^3$, a melting temperature of from about 400° to 500° F., and a vaporization temperature of about 500° to 600° F. Further details on these beads can be found in U.S. Pat. No. 5,073,525, the content of which is expressly incorporated herein by reference thereto. These beads, in combination with the paper fibers, provide the refractory composition with a dried density of as low as about 80 pounds per cubic foot.

The composition also contains about 0.1 to about 2% of a stiffening agent and about 0.1 to about 2% of a set retarding agent. The stiffening agent is added to impart initial gelling properties to the composition when it is mixed with water. For spray application, an amount of water in the range of about 20 to 30% is typically added to provide a pumpable viscosity. Preferably, the stiffening agent is an alkali-free phosphate compound, such as an alkaline earth phosphate, an aluminum phosphate, encapsulated phosphoric acid, ammonium phosphate or an organic phosphate compound. Of these compounds, monocalcium phosphate is the most advantageous. The stiffening agent also imparts high temperature strength to the composition.

The set retarding agent is added to control the gelling properties of the stiffening agent, thus imparting a practical residence time to the composition. The set retarding agent is added in an amount of about 0.1 to about 2% and is preferably an organic acid. Any di- or tribasic carboxylic acid may be used, with citric, tartaric, oxalic or malic acid being representative. Of these, powdered citric acid has been found to be the most advantageous.

These agents also may be further adjusted within the previously described ranges to control the viscosity of the refractory composition while being pumped through a spray apparatus. Optimum performance during application of the composition is achieved by controlling the weight ratio of stiffening agent to set retarding agent. A ratio of about 3:1 to 1:3 is suitable, with between about 1.5:1 to 1:1.5 being preferred. The most advantageous ratio is about 1:1. At this level, these agents co-act to prevent slumping of the refractory material during the period of time immediately following spraying and prior to drying.

The set retarding agent prevents the refractory composition from prematurely reaching too high a viscosity which would effectively restrict flow through the spray apparatus. It is preferred that the set retarding agent be used in an amount which provides a refractory material residence time within the spray apparatus of up to about 30 to 40 minutes without causing blockages in the apparatus. Therefore, the composition allows spraying to resume after a 30–40 minute work stoppage without the necessity of debriding spray head or hoses connected thereto. A 1:1 weight ratio of powdered citric acid and monocalcium phosphate is most preferred for imparting the desired residence time and anti-slumping characteristics to the composition.

The refractory composition of the present invention may further comprise from about 0.1 to 2% of a secondary binder. It has been found that the addition of this binder contributes to refractory strength while also improving air entrainment to the composition to further reduce its density. The secondary binder is a starch, cereal or natural or synthetic resin. It is preferred that this binder be an alkaline earth lignosulfonate such as, for example, calcium lignosulfonate.

EXAMPLES

The following non-limiting examples further illustrate the preferred embodiments of the present invention.

EXAMPLE 1

The following test formulations were prepared by dry blending the components to a homogeneous batch, combining the batch with 25% water, and mixing the combination to substantially uniformly distribute the water throughout the batch. As shown in Table 1, varying amounts of stiffening and set retarding agents were used and their effects on the gelling properties of the composition were evaluated.

TABLE 1

| Material | 1 | 2 | A | B | C | D | E |
|---|---|---|---|---|---|---|---|
| MgO | 92.7 | 92.7 | 92.7 | 92.2 | 92 | 92.2 | 92.2 |
| Olivine | 2 | 2 | 2 | 2 | 2 | 2 | 2 |
| Bentonite | 2 | 2 | 2 | 2 | 2 | 2 | 2 |
| Calcium Lignosulfonate | 0.5 | 0.5 | 0.5 | 0.5 | 0.5 | 0.5 | 0.5 |
| Monocalcium Phosphate | — | 1 | 0.5 | 0.75 | 0.85 | 0.5 | 1 |
| Powdered Citric Acid | 1 | — | 0.5 | 0.75 | 0.85 | 1 | 0.5 |

TABLE 1-continued

| Material | 1 | 2 | A | B | C | D | E |
| --- | --- | --- | --- | --- | --- | --- | --- |
| Coarse Paper Fibers | 1.2 | 1.2 | 1.2 | 1.2 | 1.2 | 1.2 | 1.2 |
| Expanded Polystyrene Beads (Type #2) | 0.6 | 0.6 | 0.6 | 0.6 | 0.6 | 0.6 | 0.6 |

TABLE 2

| Sample | Qualitative Observations |
| --- | --- |
| Sample 1 | Very little stiffening |
| Sample 2 | Very little stiffening |
| Sample A | Stiffened somewhat overnight |
| Sample B | Stiffened somewhat overnight (a little more than A) |
| Sample C | Stiffened in about one hour |
| Sample D | Some stiffening in about 4 hours |
| Sample E | Some stiffening in about 4 hours |

Sample C, having 0.85 percent of monocalcium phosphate and 0.85 percent citric acid, exhibited a preferable stiffening time which would enhance slump resistance and residence time.

EXAMPLE 2

It has been found that a density of less than 90 p.c.f. may be attained by incorporating an ultra lightweight aggregate comprising expanded polystyrene beads (type #2) and coarse paper fibers into the refractory composition.

Table 3 below lists four test formulations which were prepared as described above in Example 1 except that the water content is stated in the Table. Varying amounts of expanded polystyrene beads were used to evaluate the effects on the dried density of the composition as well as the dispersibility of the beads in the dry composition.

TABLE 3

| Material | F | G | H | I |
| --- | --- | --- | --- | --- |
| MgO | 92 | 92.25 | 91.3 | 92 |
| Olivine | 2 | 2 | 2 | 2 |
| Bentonite | 2 | 2 | 2 | 2 |
| Calcium Lignosulfonate | 0.5 | 0.5 | 0.5 | 0.5 |
| Monocalcium Phosphate | 1 | 1 | 1 | 0.85 |
| Powdered Citric Acid | 1 | 1 | 1 | 0.85 |
| Coarse Paper Fibers | 1 | 1 | 1.5 | 1.2 |
| Expanded Polystyrene Beads | 0.5 | 0.25 | 0.7 | 0.6 |
| Water % | 24.9 | 22.0 | 26.0 | 25.0 |
| Density (pcf) | 84.0 | 100.4 | 83.8 | 85.0 |

As indicated above, samples F, H and I exhibit dried densities which are well below 90 p.c.f. Sample I met the criteria of dried density (less than 90 p.c.f.) while also exhibiting good dispersibility of the beads in the dry powder prior to mixing with water.

EXAMPLE 3

The formulation of sample I of Example 2 was used in a number of spray application field tests. The composition was tested as a disposable tundish liner at several locations. The composition met the requirements for spray application, i.e. delivery rates, residence time, slump resistance, etc. The resulting lining also met performance requirements in the areas of drying, preheating, molten metal and slag resistance, durability and sequencing requirements. The deskullability of the lining was found to be good in all locations and improved over those which use conventional alkali oxide containing refractory compositions.

While it is apparent that the invention herein disclosed is well calculated to fulfill the objectives above stated, it will be appreciated that numerous modifications and embodiments may be devised by those skilled in the art. It is intended that the appended claims cover all such modifications and embodiments as fall within the true spirit and scope of the present invention.

We claim:

1. A refractory composition for use as a disposable lining comprising:
   a refractory aggregate;
   an alkali free phosphate compound in an amount sufficient to impart stiffening properties to the composition, in combination with a set retarding agent which is added in an amount sufficient to prolong the setting time of the composition when mixed with water;
   at least one density reducing material in an amount sufficient to reduce the density of the composition; and
   a plasticizer in an amount sufficient to enhance the ability of the composition to adhere to vertical surfaces after mixing with water.

2. The composition of claim 1 wherein the stiffening agent and set retarding agent are present in a weight ratio of between about 3:1 and about 1:3.

3. The composition of claim 2 wherein the aggregate is a source of magnesia having at least about 85% MgO, the composition contains less than about 0.1 weight percent of alkali oxides, the stiffening agent is an alkaline earth phosphate, an aluminum phosphate, encapsulated phosphoric acid, ammonium phosphate or an organic phosphate compound, and the set retarding agent is citric, tartaric, oxalic or malic acid or mixtures thereof.

4. A refractory composition for use as a disposable lining comprising:
   from about 0.1 to about 2 weight percent of a stiffening agent comprising an alkali free phosphate compound;
   from about 0.1 to about 2 weight percent of a set retarding agent;
   from about 0.1 to about 6 weight percent of a density reducing material;
   from about 0.1 to about 5 weight percent of a plasticizer; and
   at least about 85 weight percent of a refractory aggregate.

5. The composition of claim 4 wherein the stiffening agent is an alkaline earth phosphate, an aluminum phosphate, encapsulated phosphoric acid, ammonium phosphate or an organic phosphate compound.

6. The composition of claim 4 wherein the stiffening agent is monocalcium phosphate.

7. The composition of claim 4 wherein the set retarding agent is an organic acid.

8. The composition of claim 4 wherein the set retarding agent is citric, tartaric, oxalic or malic acid or mixtures thereof.

9. The composition of claim 4 wherein the stiffening agent and set retarding agent are present in a weight ratio of between about 3:1 and about 1:3.

10. The composition of claim 4 wherein the density reducing material is an inorganic fiber, an organic fiber, an expanded inorganic material, an expanded organic material or mixtures thereof.

11. The composition of claim 4 wherein the density reducing material is a cellulose fiber, expanded clay, polystyrene beads or mixtures thereof.

12. The composition of claim 4 wherein the plasticizer is a bentonite clay, a kaolin clay or ball clay.

13. The composition of claim 4 wherein the aggregate is magnesia, doloma alumina, calcia, silica or mixtures thereof.

14. The composition of claim 4 wherein the aggregate is a source of magnesia having at least about 85% MgO and the composition contains less than about 0.1 weight percent of alkali oxides.

15. A refractory composition for use as a disposable lining comprising:
   from about 0.1 to 2 weight percent of a stiffening agent of an alkali free phosphate compound;
   from about 0.1 to about 2 weight percent of a set retarding agent;
   from about 0.1 to about 5 weight percent of a first density reducing material;
   from about 0.1 to about 1 weight percent of a second density reducing material;
   from about 0.1 to about 5 weight percent of a plasticizer;
   from about 0.1 to about 2 weight percent of a binder; and
   at least about 83 weight percent of a refractory aggregate.

16. The composition of claim 15 wherein the stiffening agent is an alkaline earth phosphate, an aluminum phosphate, encapsulated phosphoric acid, ammonium phosphate or an organic phosphate compound, and the set retarding agent is citric, tartaric, oxalic or malic acid or mixtures thereof.

17. The composition of claim 15 wherein the stiffening agent is monocalcium phosphate and the set retarding agent is powdered citric acid.

18. The composition of claim 15 wherein the stiffening agent and set retarding agent are present in a weight ratio of between about 1.5:1 and about 1:1.5.

19. The composition of claim 15 wherein the first density reducing material is an organic fiber and the second density reducing material is an expanded inorganic or organic material.

20. The composition of claim 15 wherein the plasticizer is a bentonite clay, a kaolin clay or ball clay.

21. The composition of claim 15 where the binder is an organic binder of a starch, cereal or natural or synthetic resin.

22. The composition of claim 15 wherein the aggregate is a source of magnesia having at least about 85% MgO and the composition contains less than about 0.1 weight percent of alkali oxides.

23. A refractory composition for use as a disposable lining comprising:
   from about 0.1 to 2 weight percent of a stiffening agent of monocalcium phosphate;
   from about 0.1 to about 2 weight percent of a set retarding agent of powdered citric acid;
   from about 0.1 to about 5 weight percent of paper fibers;
   from about 0.1 to about 1 weight percent of polystyrene beads;
   from about 0.1 to about 5 weight percent of a clay;
   from about 0.1 to about 2 weight percent of calcium lignosulfonate; and
   at least about 83 weight percent of a refractory aggregate of a source of magnesia having at least about 85% MgO and at least about 1 to about 5 weight percent olivine and less than about 0.1 weight percent of alkali oxides;
   wherein the stiffening agent and set retarding agent are present in a weight ratio of about 1:1.

24. A vessel for handling molten metal comprising:
   means for holding molten metal therein;
   a permanent refractory lining disposed within the holding means for protecting the holding means against the effects of the molten metal; and
   a disposable refractory lining disposed upon at least a portion of the permanent refractory lining and comprising the composition of one of claims 1, 4 or 23.

25. A method of using the composition of any one of claims 1, 4 or 23 to provide a disposable refractory lining which comprises:
   mixing the composition of any one of claims 1, 4 or 23 with a sufficient amount of water to form a sprayable mixture; and
   spraying the mixture onto an inner surface of a molten metal holding vessel to form a disposable liner therein.

* * * * *